Jan. 1, 1957 R. G. CLARK 2,775,990
MITERING SAW UNITS
Filed July 22, 1954 2 Sheets-Sheet 2
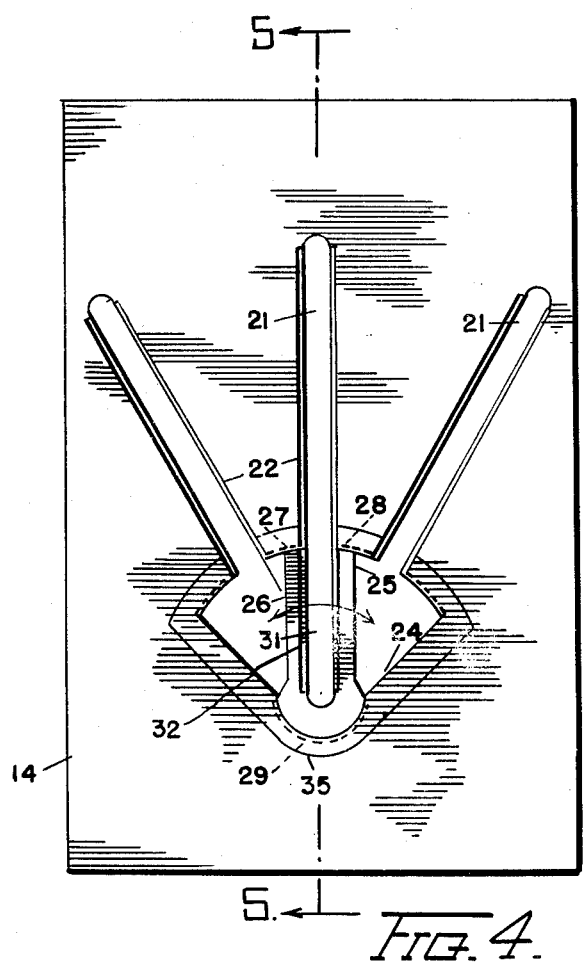
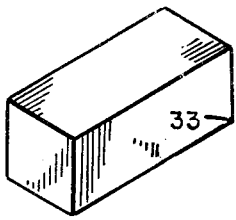
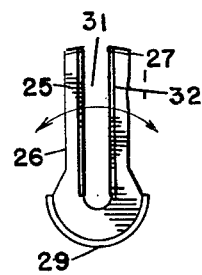
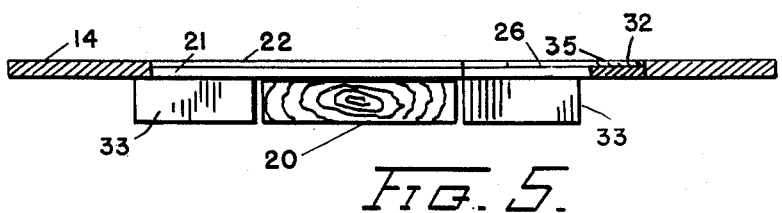
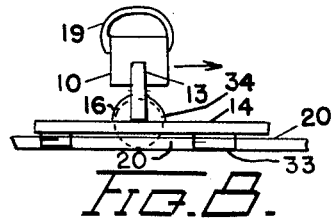
INVENTOR.
ROBERT G. CLARK
BY
HIS ATTORNEY.

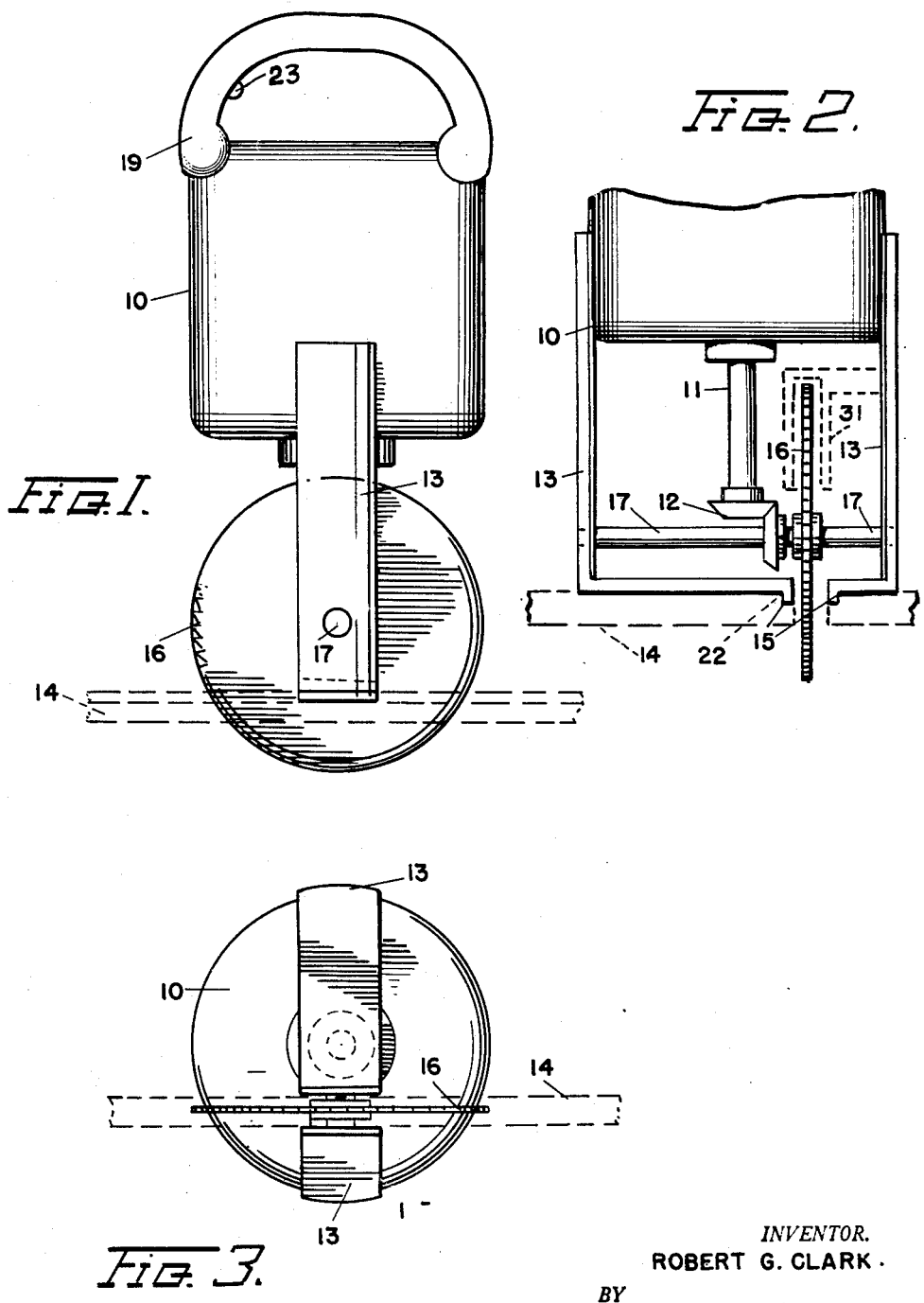

United States Patent Office 2,775,990
Patented Jan. 1, 1957

2,775,990

MITERING SAW UNITS

Robert G. Clark, Baltimore, Md.

Application July 22, 1954, Serial No. 444,999

12 Claims. (Cl. 143—6)

This invention relates to tools and more particularly to those of the rotary saw class. It has among its objects to provide a new and improved type of mitering saw unit that will avoid one or more of the disadvantages and limitations of the previous art. Another object of the invention is to provide a new and useful type of mitering rotary saw unit that will enable "cuts" to be made accurately, expeditiously and conveniently. An additional object of this invention is to provide a new and improved rotary saw unit that will be simple in construction, effective in operation and easy to handle. A further object of the invention is to provide a new and improved mitering saw unit designed for portability and convenience, as well as applicability for use with benches, tables and other equipment employed in the making of articles of wood, plastic, metals and other materials capable of being sawed.

Other objects will become apparent as the invention is more fully described.

In the manufacturing of articles through the use of a saw, difficulty is frequently experienced by operators in producing an accurate cut, especially where parts are intended to be mitered and fitted together. A slight deviation from the proper angle produces a joint that shows a crack that is unsightly and also tends to weaken its structure. This is principally due to the lateral position of the saw in the frame of the unit and the need for a miter box handled independently of it. The user is compelled to take positions and handle material in a laborious fashion that do not promote accuracy and uniformity of cutting by the saw of the unit.

In this invention, the saw unit features a frame for holding a rotary saw at a convenient angle and an auxiliary guide plate for directing its travel in the desired direction. This it does automatically and conveniently. The direction of travel may be varied readily and is accomplished without the use of screws and other conventional means commonly employed in the adjustment of mechanisms included in portable hand saws. The device is made compact so that it can be carried around on a belt mounted on the body of the user, when not in use, and is easily detached by him for working the material involved in the work he has in hand.

For a better understanding of the invention and the objects thereof, reference is made to the accompanying drawings wherein a particular form of the invention is illustrated. These drawings outline a preferred structure and in conjunction with the following description explain the principles and operation of its components.

Figure 1 is a side elevation of the motor component of a circular portable saw embodying this invention;

Figure 2 is a view taken at right angles to Figure 1 of the lower portion of the motor component;

Figure 3 is an underneath plan of Figure 1;

Figure 4 is a plan view of the guide plate component used in this embodiment;

Figure 5 is a section on line 5—5 of Figure 4;

Figure 6 is a plan view of the key used in this embodiment;

Figure 7 is a perspective detail of a magnetic clamp used with this embodiment;

Figure 8 is a diagrammatic view of the assembled saw unit.

Similar reference characters refer to the same parts throughout the drawings.

In the drawings, a circular saw unit is shown consisting of a motor 10 adapted for vertical positioning during operation, having its shaft 11 extended longitudinally through it, with a bevel gear 12 mounted on its exterior terminus. A set of brackets 13 are attached to the side of the motor and support it vertically above the guide plate 14. The guide plate is grooved to engage flanges 15 on the brackets and guide the circular saw 16 in its working travel. The saw 16 is supported on a shaft 17 journalled in the brackets 13, and actuated through a bevel gear meshed in the gear 12. The motor 10 has a handle 19 of the spade type, attached to its upper section to permit manual manipulation with a minimum amount of visual interference.

The guide plate 14 serves as a guide to control the travel of the circular saw through the wood, plastic, metal or other material forming the article 20 to be cut by it. This guidance is brought about by having longitudinal slots 21 extended through the guide plate as indicated in the drawings, in the directions selected for mitering or sawing through the article 20. The brackets 13 are held by the flanges 15 in the grooves 22, and incidently cause the circular saw 16 to pass within the slot 21 selected, in a straight line and provide for an accurate cutting or sawing of the article as required, along that angle. Any suitable arrangement, such as a switch 23 mounted on the handle 19 can be used for the operative control of the motor 10. The position of the circular saw 16 with regard to the guide plate 14 is such as to keep its cutting depth ample for the thickness of the article placed under the plate. Any suitable means may be employed for securing the guide plate to the article during the sawing or cutting of the latter.

The guide plate 14, may be of any suitable contour, provided its upper and lower surfaces are substantially flat and smooth. In the central area of the bedplate is located preferably, the slots 21 extending radially in the selected angular directions from a quadrant-like opening 24. This opening is enlarged around its center to a segmental form to hold one end portion 25 of a revolving key 26. This key 26 rotates in the opening 24 within the limits allowed by the sides of the latter. The key has an upper ridge 27 designed to run a groove 28 formed in the bedplate adjacent the periphery of the opening 24, as well as a second lower ridge 29 in an adjacent peripheral groove 30. These ridges and grooves maintain the key in place and enable it to rotate effectively therein.

The key has a longitudinal slot 31 adapted to align with the slots 21 when adjusted respectively with them. It also has lateral recesses 32 alignable with the grooves 22. These grooves and recesses enable the motor and brackets attached to it to be moved directionally through the guide plate from the quadrant space to the ends of the slots 21.

The conventional circular power saw designed for manual manipulation while capable of effective work and performing the task of cutting wood and the like, is built with the axis of the saw and motor in alignment or parallel thereto. In this invention such are at right angles, and the handle placed vertically above the motor, instead of rearwardly, and by employing a transparent guard over the saw, the work of cutting can be observed and accurately maintained. The motor 10 is normally in a vertical position over the plane of the work when the latter is horizontal, and operates with its axis at right angles thereto. In this description, the motor and saw is termed a vertically disposed unit to distinguish from the conventional saw with its axis normally horizontal and which operates its motor in a horizontal plane, when the work is located in the horizontal plane. The terms hold even though the work can be cut in a vertical plane, also.

In the general operation of the device, the user sets the motor, brackets and flanges over the quadrant space 24 and rotates or swings the unit until it is pointed in the direction, of the selected slot 21, and its grooves 22. The motor is started and the revolving circular saw 16 is moved through the article 20 under the bedplate until the latter is sawed through. The motor is then moved back to the quadrant space to repeat the operation on another article.

The unit has several conspicuous features not incorporated in the conventional portable saw. The position of the handle permits visual access to the work being done. In addition the work is accomplished accurately. The saw is quickly placed in position and is set quasi-automatically in the right direction. It avoids the need of an elaborate extra framework for the handle, since the latter is mounted directly on the motor. This reduces the structural requirements and weight of the unit. In connection with the making of frames of various kinds, where the mitering of corners is particularly important, the use of the device provides for the accomplishment of the work, expeditiously, accurately and conveniently. The turntable operation of this key is unique while at the same time providing an effective placement of the circular saw and motor in their variable positions.

A guard 31 is mounted on the bracket 13 over the circular saw, and is preferably of glass so as to permit the user to observe what the saw is doing and check on its cutting travel. It will be noted that the guide-plate is provided with a peripheral cover 35 that holds the key 26 in place by locking in its ridges or tongues 27 and 29 yet permitting its rotation during a change in mitering alignment. As a simple and effective means for clamping the article 20 in place under the guiding plate, a set of magnetic blocks 33 are used, in preference. These can be placed on quickly and require no tools, and are adaptable to placement anywhere on the guiding plate when made of iron or steel.

While but one form of the invention is outlined herein, it is not desired to limit this application for patent, to such form, as it is appreciated that other forms and variations could be designed and made that would employ the same principles and come within the scope of the appended claims.

Having thus described the invention what is claimed is:

1. A portable circular saw unit comprising in combination a circular saw, a vertically disposed motor for rotating said saw under it, a normally horizontal guide plate including slots diverging from a predetermined area thereof, said motor being free of the plate except for guide means extending below the saw arbor and relatable to said slots, means for selectively carrying the motor and saw over said plate in selected ones of plural directions determined by said slots respectively and sequentially and enabling said circular saw to cut an article on which said plate is rested along a selected predetermined line, when said circular saw is manually propelled during its operation.

2. A portable circular saw unit comprising in combination a circular saw, a motor for rotating said circular saw, a normally horizontal guide plate including a plurality of slots radiating from a central area thereof and free of the motor, except for guide means extending below the saw arbor from the motor and relatable to said slots, means for selectively carrying the motor and circular saw over said plate in selected ones of plural directions determined by said slots respectively and sequentially and enabling said circular saw to cut an article on which said plate is rested along a line predetermined by the selected slot, when said circular saw is manually propelled during its operation, a lone handle on the motor mounted on the upper portion and at right angles to the axis of the motor and above it and positioned to avoid visual obstruction of the saw, on the part of the user of the unit.

3. The same as claim 1 and including a mechanism for operationally connecting said motor and circular saw together to maintain the axis of the motor in a normal vertical position during operation.

4. The same as claim 3 and including flanges on the said means for structurally engaging the guide plate so as to be directionally guided thereby as aforesaid said slots being linear throughout to guide the saw in a straight line therein throughout their lengths.

5. The same as claim 4 and including grooves in said guide plate; a key operationally mounted on said plate in alignment with said grooves and adapted for variable placement therein to turntable position said motor and circular saw in said plate in a selective position as aforesaid said slots being linear throughout to guide the saw in a straight line therein throughout their lengths.

6. The same as claim 5 and including grooves for said flanges arranged in said plate, said guide plate including slots bordered by said grooves, said slots being arranged for the operational rotation of the circular saw therein during its travel said slots being linear throughout to guide the saw in a straight line therein throughout their lengths.

7. The same as claim 6 and including said key also including a slot for sequential alignment with said slots in the guide plate said slots being linear throughout to guide the saw in a straight line therein throughout their lengths.

8. The same as claim 7 and means for adjustably attaching said plate to the article said slots being linear throughout to guide the saw in a straight line therein throughout their lengths.

9. The same as claim 8 and means for handling the unit manually from the motor structure disposed in the upper section thereof said slots being linear throughout to guide the saw in a straight line therein throughout their lengths.

10. The same as claim 9, and including: and a guard of transparent material to allow observance of the saw and the line of travel taken by the latter during its cutting operation of the said article said slots being linear throughout to guide the saw in a straight line therein throughout their lengths.

11. The same as claim 6 and including: means for clamping the said plate to the article to maintain a rigid attachment thereto said slots being linear throughout to guide the saw in a straight line therein throughout their lengths.

12. The same as claim 11 and including: said motor and saw being integrally incorporated together and so operationally installed to the guide plate and key as to permit facile detachment from each other when optionally determined by the user said slots being linear throughout to guide the saw in a straight line therein throughout their lengths.

References Cited in the file of this patent

UNITED STATES PATENTS

| | | |
|---|---|---|
| 1,170,454 | Magerkurth | Feb. 1, 1916 |
| 1,352,519 | Laserson | Sept. 14, 1920 |
| 1,464,351 | Casey | Aug. 7, 1923 |
| 1,546,982 | Hilthon et al. | July 21, 1925 |
| 1,700,189 | Wikstrom | Jan. 29, 1929 |
| 1,911,045 | Tinnen | May 23, 1933 |
| 1,960,590 | McKay | May 29, 1934 |
| 2,441,378 | Zielinski | May 11, 1948 |